United States Patent [19]

Rittler

[11] 4,030,903

[45] June 21, 1977

[54] EXUDED TRANSITION METAL FILMS ON GLASS-CERAMIC ARTICLES

[75] Inventor: Hermann L. Rittler, Horseheads, N.Y.

[73] Assignee: Corning Glass Works, Corning, N.Y.

[22] Filed: Dec. 24, 1975

[21] Appl. No.: 644,130

Related U.S. Application Data

[63] Continuation-in-part of Ser. No. 431,148, Jan. 1, 1974, Pat. No. 3,962,514.

[52] U.S. Cl. .................................. 65/32; 65/30 R; 65/33; 65/60 D; 106/39.6; 106/39.8; 252/477 R
[51] Int. Cl.² .................. C03B 32/00; C03C 15/00; C03C 17/00; C03C 3/22
[58] Field of Search ............. 65/32, 33, 30 R, 60 D; 106/39.8, 39.6; 252/477 R

[56] References Cited

UNITED STATES PATENTS

| | | |
|---|---|---|
| 3,231,456 | 1/1966 | McMillan et al. ................. 65/32 X |
| 3,557,576 | 1/1971 | Baum .................................... 65/32 |
| 3,639,113 | 2/1972 | Aslanova et al. ................... 65/32 X |
| 3,704,110 | 11/1972 | Finn et al. ............................ 65/32 |
| 3,790,360 | 2/1974 | Kato et al. ........................... 65/32 |
| 3,876,407 | 4/1975 | Hirose et al. ...................... 65/32 X |
| 3,900,306 | 8/1975 | Brueggemann ................... 106/39.8 |
| 3,914,517 | 10/1975 | Pirooz ............................... 65/32 X |

*Primary Examiner*—S. Leon Bashore
*Assistant Examiner*—Frank W. Miga
*Attorney, Agent, or Firm*—Kees van der Sterre; Clinton S. Janes, Jr.; Clarence R. Patty, Jr.

[57] ABSTRACT

Suitable glass-ceramic base compositions, including some silicates, aluminosilicates, lithium aluminosilicates, and boroaluminates, are modified by the addition of suitable quantities of transition metal oxides prior to melting and forming into thermally-crystallizable glass articles. Appropriate crystallization and post-crystallization heat treatments are thereafter employed to cause crystallization of the articles and the formation and growth of films thereon, which films are characterized by the presence of transition metal compounds, typically of spinel structure, therein. Such films demonstrate useful electrical, magnetic, catalytic and/or light-absorptive properties.

8 Claims, No Drawings

EXUDED TRANSITION METAL FILMS ON GLASS-CERAMIC ARTICLES

CROSS-REFERENCE TO RELATED APPLICATION

This application is a continuation-in-part of my co-pending application, Ser. No. 431,148, filed Jan. 1, 1974, and commonly assigned herewith, now U.S. Pat. No. 3,962,514.

BACKGROUND OF THE INVENTION

Transition-metal-containing crystalline compounds of spinel structure are important constituents of inorganic coatings employed for an extremely wide variety of applications. For example, iron-containing spinels such as magnetite ($Fe_3O_4$), and also other ferrites such as manganese, cobalt and nickel ferrites, have been applied to a variety of organic and inorganic substrates in order to impart desirable electromagnetic properties thereto. Processes for applying such coatings and controlling the properties thereof in the course of deposition comprise a large body of technology and include vapor deposition, precipitation, evaporation and thermal decomposition techniques.

Similarly, a large number of transition metal oxides of spinel or ilmenite structure are included within the classes of catalytically-active compounds, and have been applied in the form of coatings to a variety of metal, glass and ceramic supports for use in catalytic processes. Among the transition metal oxides useful in catalysis are $Mn_3O_4$, $MnAl_2O_4$, $MnCr_2O_4$, $FeAl_2O_4$, $CoAl_2O_4$, $NiAl_2O_4$, $CoTiO_3$, $MnTiO_3$, $FeTiO_3$, $CeTiO_4$, $CuAl_2O_4$ and $CuCr_2O_4$.

In virtually all applications wherein transition metal oxide coatings are employed in combination with inorganic substrates, coating adherence and durability are extremely important properties. In many applications, binders are required to enable these coatings to demonstrate the toughness needed to withstand the shocks and abrasion of use. In the case of inorganic substrates exhibiting low surface porosity, bonding agents or high sintering temperatures are required to obtain coatings demonstrating a useful degree of adherence to the support. In the case of magnetic recording media such as magnetic memory discs, extreme surface flatness is required, compounding the difficulty of providing a durable, adherent coating.

In catalytic applications, particularly where high temperatures are involved, interactions between active oxide coatings and incompatible binders and/or supporting materials can cause reductions in activity due to the growth of inactive reaction phases or sintering. Yet the attainment of good adherence to commercial supports often requires the use of binders and/or high-temperature sintering treatments.

What is therefore desired is a means for providing transition-metal-containing oxide surface layers on compatible inorganic supports wherein bonding agents, binders, and high sintering temperatures are not required to obtain adherence, toughness and stability in the active film.

SUMMARY OF THE INVENTION

I have now devised a means of providing transition metal oxide surface films on glass-ceramic articles which overcomes the various problems of adherence, flatness, durability and thermal stability encountered in the prior art. Glass-ceramic articles are a relatively recent development in ceramic technology, the first commercially practicable articles being described by Stookey in U.S. Pat. No. 2,920,971. Briefly, the manufacture of glass-ceramics conventionally involves first compounding and melting a batch for a glass to which an amount of a crystallization-promoting or nucleating agent has been added, thereafter forming a glass article from the melt and cooling the article at least below the transformation range of the glass, and finally reheating the glass article according to a defined time-temperature schedule to produce internal nucleation and crystallization in situ thereof. The resulting article is uniformly crystallized, non-porous, free of voids, and retains the shape of the parent glass article. For a more complete description of glass-ceramic manufacturing theory and practice, reference may be made to the aforementioned Stookey patent and numerous subsequently published patents, articles and texts.

The present invention is based on the discovery that certain base glass-ceramic compositions, when modified by the addition of specified quantities of transition metal oxide modifiers, can be crystallized and thereafter heat-treated in a manner which will promote the formation and growth of transition metal oxide surface films thereon. In this way, glass-ceramic articles having integral surface films demonstrating desirable electrical, magnetic, light-absorptive and/or catalytic properties may be produced. The integral nature of these so-called exuded transition metal oxide films inherently provides the desired properties of adherence, durability and substrate compatibility.

Transition metals suitable for inclusion in glass-ceramic base compositions according to the invention include manganese, iron, cobalt, copper, chromium, nickel and vanadium. Among the useful crystalline phases which may be present in exuded transition metal oxide films produced according to the invention are $Mn_3O_4$, $Co_3O_4$, $NiFe_2O_4$, $MnFe_2O_4$, $CoFe_2O_4$, $CuCr_2O_4$, $FeCr_2O_4$, $MnCr_2O_4$, $CoMn_2O_4$, $CoTiO_3$, $Co_2TiO_4$, $MnTiO_3$, $FeTiO_3$, $VAlO_4$, $CuAl_2O_4$, $CrAl_2O_4$, $NiAl_2O_4$, $FeAl_2O_4$, $CoAl_2O_4$, $MnAl_2O_4$, $Mn_2Al_2(SiO_4)_2$, $MnNb_2O_6$, $NiNb_2O_6$ and $Ti_2Nb_{10}O_{29}$.

In many cases, exuded transition-metal-containing films produced according to the invention also demonstrate useful light reflecting and transmitting properties. Decorative films over a wide range of colors may be produced, or transparent or translucent bodies exhibiting sharp electromagnetic cutoff values may result.

The end properties of the particular film produced depends on the composition of the base glass-ceramic composition selected as a support and upon the transition metal oxide additives selected for incorporation into the base composition.

Whereas certain of the base glass-ceramic compositions amenable to treatment according to the present invention are generally known, the capability of producing useful exuded transition-metal-containing films on glass-ceramics had been found to depend not only upon the composition of the glass-ceramic material selected as a base but also upon the nature of the subsequent treatment of the material to cause the formation and growth of useful exuded oxide films thereon. In general, the formation and growth of transition-metal-containing oxide films is promoted by heat-treating transition metal-doped glass-ceramic articles under reducing conditions at elevated temperatures for a period of time sufficient to attain the desired degree of film growth.

There is some evidence that the initiation of film formation occurs in some systems in the course of crystallization in situ of the glass precursor body. While such films are not typically sufficiently developed to be useful, the existence of the phenomenon indicates that crystallization need not be entirely complete prior to the commencement of the reduction heat treatment which is employed to achieve the growth of the exuded film. However, completion of the bulk crystallization process prior to or at least concurrently with the formation of the exuded transition-metal-containing film is normally required.

For the purposes of the present description, exuded transition-metal-containing films include not only films composed essentially entirely of transition metal oxide compounds such as $MnAl_2O_4$, $Fe_3O_4$, and the like, but also films wherein such compounds are in solid solution or combination with other crystalline species such as transition-metal-free aluminates, silicates, titanates, or similar compounds. Glassy matrix phases commonly found in semi-crystalline glass-ceramic materials produced from the crystallization in situ of glasses may also be present in these exuded films. In the preferred embodiments, however, crystalline transition metal oxide compounds normally comprise a predominate proportion (at least about 50% by volume) of the exuded film.

DESCRIPTION OF THE PREFERRED EMBODIMENTS

A particularly useful class of base glass-ceramic compositions suitable for treatment according to the invention are the aluminosilicate and lithium aluminosilicate compositions characterized by the presence of beta-spodumene and/or beta quartz solid solutions as principal crystal phases. This base glass composition area includes compositions consisting essentially, in weight percent on the oxide basis as calculated from the batch, of about 55–80% $SiO_2$, 14–35% $Al_2O_3$, 0–5% $Li_2O$, 0–7% $TiO_2$, 0–10% $ZrO_2$, 3–13% total of $TiO_2 + ZrO_2$, and 0–3% F, to which may be added a total of 0.1–10% of transition metal oxide additives. Suitable transition metal oxide additives include one or more oxides selected in the indicated proportions from the group consisting of 0–5% $MnO_2$, 0–5% $Fe_2O_3$, 0–3% $CoO$, 0–2% $CuO$, 0–2% $Cr_2O_3$, 0–3% $V_2O_5$, and 0–10% $NiO$. Minor amounts of other compounds may, of course, be included within these compositions as aids in melting, to modify properties, or for other known purposes. Examples of additives which have been employed are $La_2O_3$, $Nb_2O_5$, $BaO$, $B_2O_3$, $P_2O_5$, $MgO$, $CaO$, $ZnO$, $Na_2O$, $K_2O$, $Ta_2O_5$, Cl, Br, $As_2O_3$, and $Sb_2O_3$. The total amount of these additives, however, is generally held to not more than about 10% by weight, so that the basic constituents $SiO_2$, $Al_2O_3$, $Li_2O$, $TiO_2$, $ZrO_2$, F, and transition metal oxides will comprise at least about 90% by weight of the glass-ceramic composition.

Glass-ceramic compositions within the above described composition range may be compounded and melted in accordance with conventional glass-making practice, and thereafter formed into glass articles by conventional means such as pressing, rolling, casting, spinning or the like. The batch materials may consist of oxides or may comprise any other compounds which will decompose at melting temperatures to yield molten batches having calculated oxide compositions within the aforementioned range. For these compositions, melting typically requires temperatures in the range of about 1600°–1650° C. for times in the range of about 6–16 hours.

Glass articles formed from the above compositions may be converted by crystallization in situ into semicrystalline glass-ceramic articles according to processes conventional for beta-spodumene and beta-quartz-containing glass-ceramics. Such processes comprise exposure of the articles to temperatures in the range of about 700°–800° C. for times in the range of about 1–4 hours to obtain nucleation of the glass, followed by exposure to temperatures in the range of about 800°–1200° C. for times in the range of about 1–8 hours to obtain crystallization of the glass.

Following crystallization, the semicrystalline glass-ceramic articles are subjected to further heat treatment under reducing conditions to promote the development of an exuded surface phase comprising active transition metal oxide compounds thereon. Exuded films formed in the described composition system include one or more crystalline compounds selected from the group consisting of $Co_3O_4$, $Mn_3O_4$, $Fe_3O_4$, $NiAl_2O_4$, $CoAl_2O_4$, $MnAl_2O_4$, $FeAl_2O_4$, $VAl_2O_4$, $CuCr_2O_4$, $NiFe_2O_4$, $CoFe_2O_4$, $MnFe_2O_4$, $CoTiO_3$, $MnTiO_3$, $FeTiO_3$, $Co_2TiO_4$ and $CoMn_2O_4$. These may be found alone, in combination with each other, or in solid solution or combination with $MgAl_2O_4$, $VAlO_4$, $CuAl_2O_4$, $CrAl_2O_4$, $MnCr_2O_4$ and $FeCr_2O_4$.

The film-producing heat treatments suitably comprise heating at temperatures in the range of about 500°–1000° C. in a reducing atmosphere. Preferred atmospheres include hydrogen and hydrogen-containing atmospheres such as forming gas ($H_2$, $N_2$). These atmospheres may contain additional constituents such as water vapor, CO, $CO_2$, $Cl_2$ or sulfur. Of course, other conventional reducing atmospheres such as hexane, methane, ammonia or the like may also be employed if desired. Typical treatment times range from at least about ½ hour up to about 10 hours or more. Longer treatment times may be employed, if desired, but long treatments are of no practical benefit and are commercially undesirable.

After sufficient growth of the transition metal oxide film has been attained in accordance with the above-described treatment, it may be desirable to further treat the article to modify the properties of the surface film for certain applications. Leaching is sometimes useful to remove residual glassy phases and/or to modify the porosity of the film. Supplemental oxidizing and/or reducing treatments may also be employed to modify the oxidation states of certain of the film constituents. The precise nature of the supplemental treatment employed, if any, will depend on the properties desired in the film and the nature of the use for which the article is intended.

Examples of thermally-crystallizable glass compositions suitable for forming beta-spodumene and beta-quartz glass-ceramics having exuded surface films containing transition metal oxide compounds according to the invention are set forth in Table I below. Compositions are given in parts by weight on the oxide basis as calculated from the batch. These compositions were batch melted in platinum crucibles at 1625° C. for 16 hours, and then poured into steel molds to form 4 inches × 4 inches × ½ inches slabs and annealed at 650° C. Most of the compositions shown also include minor amounts of $As_2O_5$ as a fining agent; however, the amount remaining in the glass after melting is negligible and is therefore not reported.

TABLE I

| Composition | 1 | 2 | 3 | 4 | 5 | 6 | 7 | 8 |
|---|---|---|---|---|---|---|---|---|
| $SiO_2$ | 63.2% | 60.9% | 58.7% | 61.2% | 59.3% | 71.7% | 71.7% | 71.7% |
| $Al_2O_3$ | 20.5 | 20.9 | 19.5 | 20.5 | 20.5 | 15.0 | 15.0 | 15.0 |
| $Li_2O$ | 3.5 | 3.5 | 3.8 | 3.5 | 3.5 | 4.5 | 4.5 | 4.5 |
| $TiO_2$ | 4.8 | 4.8 | 4.9 | 4.8 | 4.8 | 5.5 | 5.5 | 5.5 |
| $ZrO_2$ | — | — | — | 0.1 | 0.1 | — | — | — |
| MgO | 1.7 | 1.7 | — | 1.7 | 1.7 | — | — | — |
| ZnO | 1.2 | 1.2 | 2.8 | 1.2 | 1.2 | — | — | — |
| $Na_2O$ | 0.6 | 0.6 | 0.6 | 0.6 | 0.6 | — | — | — |
| $K_2O$ | 0.3 | 0.3 | 0.3 | 0.2 | 0.2 | — | — | — |
| $P_2O_5$ | 1.2 | 1.2 | 2.6 | 1.2 | 1.2 | — | — | — |
| $B_2O_3$ | 0.4 | 0.4 | — | — | — | — | — | 5.0 |
| F | 0.1 | 0.1 | 0.1 | — | — | — | — | — |
| Br | — | — | 0.4 | — | — | — | — | — |
| $MnO_2$ | — | — | 0.4 | — | — | — | — | 0.6 |
| $Fe_2O_3$ | 1.6 | 3.0 | 4.0 | 3.0 | 3.0 | — | 1.3 | — |
| CoO | — | — | 0.9 | 0.6 | 2.4 | 2.6 | — | 2.7 |
| $Nb_2O_5$ | — | — | — | — | — | 3.5 | — | — |

The thermally-crystallizable glass articles in Table I, produced as above described, are thereafter treated as set forth below in Table II in order to produce glass-ceramic articles having beta-spodumene and/or beta-quartz solid solutions as principal crystalline phases and exuded surface films containing transition metal oxide compounds. Table II reports the crystallizing heat treatments employed to convert each thermally-crystallizable glass article to the semi-crystalline state, the principal crystal phase present in the articles after ceramming, the reducing heat treatments employed to promote the growth of transition metal oxide compounds present in the exuded surface films, the appearance of the articles after the growth treatments, and the dominant properties of the exuded films. The principal crystalline phases listed are generally solid solutions rather than specific compounds. In instances where forming gas is used as the reducing atmosphere, a gas consisting of 8% $H_2$ and 92% $N_2$ by volume was employed. Typical film thicknesses over the range of growth treatments employed range about 0.1–2 microns.

invention to provide exuded transition metal spinel films thereon having a variety of uses.

Compositions which are utilized for producing transition metal films having desirable magnetic and electrical properties are titania-nucleated lithium aluminosilicate compositions consisting essentially, in weight percent on the oxide basis as calculated from the batch, of about 58–64% $SiO_2$, 19–21% $Al_2O_3$, 2–5% $Li_2O$, 2–7% $TiO_2$, 0–1% $ZrO_2$, 3–7% total of $TiO_2 + ZrO_2$, 0–1% F, and 1–6% total of transition metal additives, essentially including iron, selected in the indicated proportion from the group consisting of 1–5% $Fe_2O_3$, 0–5% $MnO_2$, 0–5% CoO and 0–3% NiO. Exuded transition metal films produced from articles of these compositions typically include one or more compounds of spinel structure selected from the group consisting of $Co_3O_4$, $Fe_3O_4$, $Mn_3O_4$, $MnAl_2O_4$, $FeAl_2O_4$, $CoAl_2O_4$, $MnFe_2O_4$, $NiFe_2O_4$, and $CoFe_2O_4$, essentially including at least one iron compound. Example I of Table I represents the presently preferred composition for producing a film having particularly desirable magnetic properties according to the invention.

TABLE II

| | 1 | 2 | 3 | 4 |
|---|---|---|---|---|
| Nucleation Treatment | 2 hours - 780° C. | 2 hours - 780° C. | 2 hours - 780° C. | 2 hours - 780° C. |
| Crystallizaton Treatment | 6 hours - 1080° C. | 2 hours - 1100° C. | 2 hours - 1100° C. | 2 hours - 1100° C. |
| Principal Crystal Phases | β-spodumene, anatase, $MgAl_2O_4$ | β-spodumene, anatase, $MgAl_2O_5$ | β-spodumene, anatase, $ZrAl_2O_4$ | β-spodumene, anatase |
| Film Growth Treatment | 2 hours - 500° C. $H_2$ | 2 hours - 500° C. $H_2$ | 2 hours - 500° C. $H_2$ | 2 hours - 500° C. forming gas |
| Surface Appearance | purple metallic | black | black metallic | grey black |
| Exuded Crystal Phases | $FeAl_2O_4$ | $Fe_3O_4$, $FeAl_2O_4$, | $Fe_3O_4$, $CoAl_2O_4$, $Mn_3O_4$, $MnFe_2O_4$ | $CoAl_2O_4$, $Fe_3O_4$ |
| Surface Properties | magnetic - good hysteresis loop | magnetic - good hysteresis loop | magnetic - good hysteresis loop | magnetic - good hysteresis loop |
| | 5 | 6 | 7 | 8 |
| Nucleation Treatment | 2 hours - 780° C. | 2 hours - 780° C. | 2 hours - 780° C. | 2 hours - 780° C. |
| Crystallizaton | 2 hours - 1080° C. | 2 hours - 1100° C. | 2 hours - 1100° C. | 2 hours - 1100° C. |
| Principal Crystal Phases | β-spondumene, anatase | β-spodumene, $CoTiO_3$, $Co_2TiO_4$ | β-spodumene, $CoTiO_3$ | β-spodumene, $CoTiO_3$, $Co_2TiO_4$ |
| Film Growth Treatment | 2 hours - 500° C. forming gas | 2 hours - 500° C. forming gas | 2 hours - 500° C. forming gas | 2 hours - 500° C. forming gas |
| Surface Appearance | grey black | black | black | black |
| Exuded Crystal Phases | $CoAl_2O_4$, $Co_3O_4$, $Fe_3O_4$, $CoFe_2O_4$ | $Co_3O_4$, $Co_2TiO_4$, $CoTiO_3$ | $Fe_3O_4$, $TiFe_2O_4$ | $Co_3O_4$, $Mn_3O_4$, $CoMn_2O_4$, $CoTiO_3$ |
| Surface Properties | magnetic - good hysteresis loop | active catalyst $C_6H_8$ oxidation | active catalyst CO oxidation $C_6H_8$ oxidation | very active catalyst, CO oxidation, $C_6H_8$ oxidation |

From the foregoing examples it is readily apparent that a broad range of aluminosilicate and lithium aluminosilicate glass-ceramic compositions containing transition metal additives may be treated according to the Compositions which are utilized for producing glass-ceramic articles having exuded transition metal oxide films demonstrating useful catalytic activity consist essentially, in weight percent on the oxide basis as calculated from the batch of about 68–74% $SiO_2$, 14-19% $Al_2O_3$, 0-5% $Li_2O$, 0-6% $TiO_2$, 0-3% $ZrO_2$, 5-9% total $TiO_2$ + $ZrO_2$, 0-5% $B_2O_3$, 0-3% F, and 1-10% total of transition metal additives selected in the indicated proportion from the group consisting of 0-5% $Fe_2O_3$, 0-5% CoO, 0-5% $MnO_2$, 0-2% CuO, 0-2% $Cr_2O_3$, and 0-3% NiO. Exuded transition metal films produced on articles of these compositions typically contain one or more compounds selected from the group consisting of $CoTiO_3$, $Co_2TiO_4CoMn_2O_4$, $Co_3O_4$, $Mn_3O_4$, $CoFe_2O_4$, $CoAl_2O_4$, $MnTiO_3$, and $FeTiO_3$. Example 8 of Table I represents the presently preferred composition for producing a catalytically-active oxide film in this system.

Types of glass-ceramic articles other than aluminosilicate and lithium aluminosilicate beta-quartz and beta-spodumene articles are also useful in providing exuded transition-metal-containing films according to the invention. Another useful composition area is found to include somewhat diverse silicate, aluminosilicate, and boroaluminate base compositions wherein manganese is a major constituent, comprising at least about 10% by weight of the compositions. The operative composition area includes compositions consisting essentially, in weight percent on the oxide basis, as calculated from the batch, of about 10-60% $MnO_2$, at least one oxide selected in the indicated proportion from the group consisting of 10-70% $SiO_2$, 13-43% $Al_2O_3$, and 0-35% $B_2O_3$, essentially including at least about 5% $B_2O_3$ and 20% $Al_2O_3$, when $SiO_2$ is absent, not exceeding about 5% $B_2O_3$ when $Al_2O_3$ is absent, and not exeeding about 10% $B_2O_3$ when both $SiO_2$ and $Al_2O_3$ are present, the sum total of $MnO_2$ + $SiO_2$ + $Al_2O_3$+ $B_2O_3$ comprising at least about 60% by weight of the composition, 0-30% $Nb_2O_5$, 0-20% $TiO_2$, 0-5% $Fe_2O_3$, 0-10% NiO, 0-3% $Cr_2O_3$, 0-10% $ZrO_2$, 0-35% $La_2O_3$, 0-10% $Ta_2O_5$, 0-15% BaO, 0-10% $SnO_2$, 0-3% CoO, 0-4% ZnO and 0-10% $K_2O$.

MInor amounts of other compounds may, of course, be included within these compositions as aids in melting, to modify properties and so forth, including, for example, $Li_2O$, $Na_2O$, $WO_3$, $P_2O_5$, MgO, Cl, F, $MnO_3$, $Cu_2O$, $V_2O_5$, $As_2O_3$, and $Sb_2O_3$.

Glass-ceramic compositions within the aforementioned composition range may be melted according to conventional practice, typically at temperatures in the range of about 1500-1600° C. for times on the order of about 6-16 hours. The molten glasses may be formed into glass articles by conventional means such as pressing, rolling, casting, drawing or the like. Batch materials for these glasses may comprise oxides or other compounds which will decompose at melting temperatures to yield molten batches having oxide compositions within the aforementioned range.

Glass articles formed from the above compositions may be converted by crystallization in situ into glass-ceramic articles by heat treatment at temperatures in the range of about 600°-1200° C. for times in the range of about 4-24 hours. Useful crystallization treatments comprise a nucleation step wherein the article is heated at temperatures in the range of about 600°-800° C. for times on the order of 1-4 hours. Principal crystal phases in these composition systems include $MnAl_2O_4$, $Mn_3O_4$, $Mn_2Al_2(SiO_4)_2$ and $MnSiO_3$ depending somewhat on the composition of the $MnO_2$-($B_2O_3$, $Al_2O_3$, $SiO_2$) base glass.

Following crystallization, the growth of transition-metal-containing oxide films on the surface of these glass-ceramic articles is promoted using reducion heat treatments substantially the same as those above described for beta-spodumene and beta-quartz-containing articles. Such treatments typically comprise heating to temperatures in the range of about 500°-1000° C. in a reducing atmosphere, preferably an atmosphere comprising hydrogen or nitrogen-hydrogen forming gas, for treatment times in the range from about ½ hour up to about 10 hours, or more. Again, longer treatments may be employed if desired, but these are not deemed of practical benefit.

Transition-metal-containing exuded films which may form in this composition system include $Mn_3O_4$, $Fe_3O_4$, $MnAl_2O_4$, $NiAl_2O_4$, $NiFe_2O_4$, $MnFe_2O_4$, $MnCr_2O_4$, $MnNb_2O_6NiNb_2O_6$, $Mn_2Al_2(SiO_4)_2$, and $Ti_2Nb_{10}O_{29}$. The compounds in this system may be found either alone or in solid solution or combination with other crystalline species such as $MnSiO_3$ and $ZrO_2$. Residual glassy phases may also be present. Whereas the transition metal oxide films produced in these systems typically differ in composition from the interior of the article, it is possible that in certain cases the predominant surface compound is also one which predominates in the article as a whole. Nevertheless treatment according to the invention is effective to increase crystal formation in the surface layers of the article such that improved surface properties are obtained.

Examples of thermally-crystallizable glass compositions suitable for forming silicate, aluminosilicate, and boroaluminate glass-ceramics having exuded surface films containing transition metal oxide compounds according to the invention are set forth in Table III below. Compositions are given in parts by weight on the oxide basis as calculated from the batch. The compositions were batch melted in platinum crucibles at 1600° C. for about 6 hours, and then poured into steel molds to form ⅜ ×5 × 5 inch slabs and annealed at about 600° C. A few of the compositions additionally contained minor amounts of $As_2O_5$ as a fining agent, but the amount remaining in the glass after melting is small and is therefore not reported.

TABLE III

| Compositon | 9 | 10 | 11 | 12 | 13 | 14 | 15 | 16 |
|---|---|---|---|---|---|---|---|---|
| $MnO_2$ | 43.0% | 31.8% | 45.0% | 60.0% | 51.5% | 21.0% | 40.0% | 30.0% |
| $B_2O_3$ | — | — | 30.0 | 5.0 | — | — | — | — |
| $Al_2O_3$ | 20.6 | 15.1 | 25.0 | 20.0 | 13.3 | 43.0 | 25.0 | 20.0 |
| $SiO_2$ | 35.4 | 19.7 | — | — | 22.2 | 34.0 | 25.0 | 30.0 |
| $La_2O_3$ | — | 33.5 | — | — | — | — | — | — |
| $Nb_2O_5$ | — | — | — | — | 13.0 | — | — | — |
| $Ta_2O_5$ | — | — | — | — | — | 5.0 | — | — |
| $TiO_2$ | 10.0 | — | — | — | — | — | — | — |
| $SnO_2$ | — | — | — | — | — | — | — | 10.0 |
| $K_2O$ | — | — | — | — | — | — | — | 10.0 |
| BaO | — | — | — | 15.0 | — | — | — | — |
| ZnO | — | — | — | — | — | 2.0 | — | — |
| $Cr_2O_3$ | — | — | — | — | — | 1.0 | — | — |

TABLE III-continued

| Composition | 9 | 10 | 11 | 12 | 13 | 14 | 15 | 16 |
|---|---|---|---|---|---|---|---|---|
| $Fe_2O_3$ | — | — | — | — | — | 3.0 | — | — |
| CoO | — | — | — | — | — | 1.0 | — | — |
| NiO | — | — | — | — | — | 3.0 | 10.0 | — |

The thermally-crystallizable glass articles of Table III, produced as above described, are thereafter treated as set forth below in Table IV in order to produce glass-ceramic articles having exuded surface films containing transition metal oxide compounds. Table IV reports the crystallization heat treatments employed to obtain bulk crystallization in situ of the articles, the principal crystalline phases present in the articles after ceramming, the reducing heat treatments employed to promote the growth of transition metal spinel films on the articles, the transition metal spinels present in the exuded surface films, the appearance of the articles after growth treatment, and the dominant properties of the exuded films. Film dielectric constant ($K'$) and loss tangent ($\tan \delta$) are reported where determined on individual samples. In instances where forming gas is reported as present in the reducing atmosphere, a gas consisting of 8% $H_2$ and 92% $N_2$ by volume was employed. Typical film thicknesses for these exuded films over the range of growth treatments employed range about 0.1-4 microns.

$Fe_3O_4$, $MnAl_2O_4$, $NiAl_2O_4$, $MnFe_2O_4$, $NiFe_2O_4$, $MnNb_2O_6$, $Mn_2Al_2(SiO_4)_2$ and $Ti_2Nb_{10}O_{29}$, many of which provide desirable electrical, magnetic and/or catalytic properties.

Preferred boroaluminate glass-ceramic compositions according to the invention are those consisting essentially, in weight percent on the oxide basis as calculated from the batch, of about 20-35% $Al_2O_3$, 5-35% $B_2O_3$, and 28-60% $MnO_2$, optionally including 0-15% BaO and 0-35% $La_2O_3$. These compositions provide $Mn_3O_4$ and/or $MnAl_2O_4$—containing films of good quality having desirable electrical properties.

From the foregoing description it is apparent that a large number of exuded transition metal oxide films may be provided on glass-ceramic base articles according to the invention to impart a variety of useful properties thereto. Thus articles having configurations suitable for use as magnetic memories, such as discs, may be conventionally formed, crystallized and provided with flat surfaces, and thereafter heat treated to exude magnetic transition metal oxide films thereon. Similarly

TABLE IV

|  | 9 | 10 | 11 | 12 |
|---|---|---|---|---|
| Nucleation Treatment | 4 hours - 650° C. | 4 hours - 650° C. | 4 hours - 700° C. | 4 hours - 650° C. |
| Crystallization Treatment | 2 hours - 800° C. | 4 hours - 800° C. | 4 hours - 800° C. | 2 hours - 1000° C. |
| | 4 hours - 1000° C. | 4 hours - 1000° C. | | |
| Principal Crystal Phases | $MnSiO_3$, $Mn_2Al_2(SiO_4)_2$ | $MnSiO_3$ | | $Mn_3O_4$ |
| Film Growth Treatment | 4 hours - 1000° C. $H_2$ | 4 hours - 800° C. forming gas | 2 hours - 500° C. forming gas | 2 hours - 700° C. forming gas |
| Surface Appearance | liver color | liver color | brown | grey brown |
| Exuded Crystal Phases | $Mn_3O_4$, $MnAl_2O_4$ | $MnAl_2O_4$, $Mn_3O_4$ | $Mn_3O_4$, $MnAl_2O_4$ | $MnAl_2O_4$, $Mn_3O_4$ |
| Surface Properties | ferromagnetic | ferromagnetic | ferromagnetic | ferromagnetic |
| | $K' = 15.5$ | $K' = 14.0$ | $K' = 8.7$ | $K' = 14.8$ |
| | $\tan \delta = 0.042$ | $\tan \delta = 0.002$ | $\tan \delta = 0.06$ | $\tan \delta = 0.53$ |
|  | 13 | 14 | 15 | 16 |
| Nucleation Treatment | 4 hours - 650° C. | 4 hours - 650° C. | 4 hours - 780° C. | 4 hours - 650° C. |
| Crystallization Treatment | 2 hours - 1000° C | 4 hours - 1000° C. | 4 hours - 1000° C. | 2 hours - 700° C. |
| Principal Crystal Phases | | $MnSiO_3$ | $MnAl_2O_4$ | $MnSiO_3$ |
| Film Growth Treatment | 2 hours - 700° C. 2 hours - 800° C. forming gas | 2 hours - 1000° C. forming gas | 2 hours - 500° C. forming gas | forming gas |
| Surface Appearance | brown | black | black | brown grey |
| Exuded Crystal Phases | $Mn_2Al_2(SiO_4)_2$, $MnNb_2O_6$ | $Mn_3O_4$, $MnAl_2O_4$ | $Mn_3O_4$, $MnAl_2O_4$, $NiAl_2O_4$ | $Mn_3O_4$, $MnAl_2O_4$ |
| Surface Properties | ferromagnetic | ferromagnetic; active catalyst (CO, $C_6H_8$ oxidation) | ferromagnetic; active catalyst (CO, $C_6H_8$ oxidation) | ferromagnetic |
| | $K' = 14.8$ | $K' = 12.4$ | | $K' = 12.0$ |
| | $\tan \delta = 0.038$ | $\tan \delta = 0.016$ | | $\tan \delta = 0.01$ |

While the foregoing examples indicate that a broad range of manganese-containing compositions may be treated according to the invention to provide exuded crystalline films thereon, the best film properties are produced over a somewhat narrower range of composition. Among the aluminosilicate glass-ceramic compositions amenable to treatment according to the invention, those consisting essentially, in weight percent on the oxide basis as calculated from the batch, of about 19-40% $SiO_2$, 13-43% $Al_2O_3$, and 15-50% $MnO_2$, optionally including 0-4% ZnO, 0-10% $TiO_2$, 0-10% $ZrO_2$, 0-10% $SnO_2$, 0-10% NiO, 0-5% $Fe_2O_3$, and 0-30% $Nb_2O_5$, are preferred. These compositions may provide exuded films containing at least one of $Mn_3O_4$, glass-ceramic tubes, honeycombs, or the like may be formed, heat treated to exude catalytically-active films thereon, and incorporated into catalytic reactors to provide stable, durable active elements. Of course, these examples are merely illustrative of the numerous applications for glass-ceramic articles having integral exuded films which may be practiced within the scope of the present invention as defined by the appended claims.

I claim:

1. A method of providing a glass-ceramic article having an exuded surface film comprising at least one transition metal compound selected from the group consisting of $Mn_3O_4$, $Fe_3O_4$, $Co_3O_4$, $NiAl_2O_4$, $CoAl_2O_4$, $FeAl_2O_4$, $VaIO_4$, $NiFe_2O_4$, $CoFe_2O_4$, $MnFe_2O_4$, $MnTiO_3$, $CoTiO_3$, $FeTiO_3$, $Co_2TiO_4$ and $CoMn_2O_4$ on at least a portion of the surface thereof which comprises the steps of:

a. compounding a batch for a glass composition consisting essentially, in weight percent on the oxide basis as calculated from the batch, of about 55-80% $SiO_2$, 14-35% $Al_2O_3$, 0-5% $Li_2O$, 0-7% $TiO_2$, 0-10% $ZrO_2$, 3-13% total of said $TiO_2$ + $ZrO_2$, 0-3% F, and 0.1-10% total of transition metal oxide additives containing one or more of the transition metals manganese, iron, cobalt, chromium, nickel and vanadium in a combination which will provide one or more of said $Mn_3O_4$, $Fe_3O_4$, $Co_3O_4$, $NiAl_2O_4$, $CoAl_2O_4$, $MnAl_2O_4$, $FeAl_2O_4$, $VaIO_4$, $NiFe_2O_4$, $CoFe_2O_4$, $MnFe_2O_4$, $MnTiO_3$, $CoTiO_3$, $FeTiO_3$, $Co_2TiO_4$ and $CoMn_2O_4$ transition metal compounds on the surface of said article, said additives being selected in the indicated proportions from the group consisting of 0-5% $MnO_2$, 0-5% $Fe_2O_3$, 0-3% $CoO$, 0-2% $Cr_2O_3$, 0-3% $V_2O_5$ and 0-10% $NiO$, the foregoing constituents comprising at least about 90% by weight of said composition and said composition being capable of forming a principle crystal phase selected from the group consisting of beta-spodumene and beta-quartz solid solutions upon thermal crystallization thereof;

b. melting said batch at a temperature in the range of about 1600°-1650° C. for a time in the range of about 6-16 hours to provide a molten glass;

c. forming the molten glass into a glass article;

d. exposing the glass article to a temperature in the range of about 700°-800° C. for a time in the range of about 1-4 hours to obtain nucleation of the glass;

e. thereafter exposing the article to a temperature in the range of about 800°-1200° C. for a time in the range of about 1-8 hours to obtain crystallization of the glass by the formation of a principal crystal phase selected from the group consisting of beta-quartz and beta-spodumene solid solution therein; and f. exposing the article to a temperature in the range of about 500°-1000° C. in a reducing atmosphere for a time in the range of about ½-10 hours to develop said exuded surface film comprising said transition metal compounds thereon.

2. A method in accordance with claim 1 wherein the reducing atmosphere is selected from the group consisting of hydrogen and forming gas.

3. A method in accordance with claim 1 wherein:

a. the batch is compounded to provide a glass composition consisting essentially, in weight percent on the oxide basis as calculated from the batch, of about 58-64% $SiO_2$, 19-21% $Al_2O_3$, 2-5% $Li_2O$, 2-7% $TiO_2$, 0-1% $ZrO_2$, 3-7% total of $TiO_2 + ZrO_2$, 0-1% F, and 1-6% total of transition metal oxide additives, essentially including iron, selected in the indicated proportions from the group consisting of 1-5% $Fe_2O_3$, 0-5% $MnO_2$, 0-5% $CoO$ and 0-3% $NiO$, and b. the exuded surface film comprises at least one transition metal compound, essentially including at least one compound of iron, selected from the group consisting of $Co_3O_4$, $Fe_3O_4$, $MnAl_2O_4$, $FeAl_2O_4$, $CoAl_2O_4$, $NiAl_2O_4$, $MnFe_2O_4$, $NiFe_2O_4$ and $CoFe_2O_4$ and exhibits magnetic hysteresis.

4. A method in accordance with claim 1 wherein:

a. the batch is compounded to provide a glass composition consisting essentially, in weight percent on the oxide basis as calculated from the batch, of about 68-74% $SiO_2$, 14-19% $Al_2O_3$, 0-5% $Li_2O$, 0-6% $TiO_2$, 0-3% $ZrO_2$, 5-9% total of $TiO_2 + ZrO_2$, 0-5% $B_2O_3$, 0-3% F, and 1-10% total of transition metal additives selected in the indicated proportion from the group consisting of 0-5% $Fe_2O_3$, 0-5% $MnO$, 0-2% $Cr_2O_3$, and 0-3% $NiO$, and b. the exuded surface film comprises at least one transition metal compound selected from the group consisting of $CoTiO_3$, $Co_2TiO_4$, $CoMn_2O_4$, $Co_3O_4$, $Mn_3O_4$, $Fe_3O_4$, $CoAl_2O_4$, $MnTiO_3$, and $FeTiO_3$ and exhibits catalytic activity for oxidation.

5. A method of providing a glass-ceramic article having an exuded ferromagnetic surface film comprising at least one transition metal compound selected from the group consisting of $Mn_3O_4$, $Fe_3O_4$, $MnAl_2O_4$, $NiAl_2O_4$, $NiFe_2O_4$, $MnFe_2O_4$, $MnCr_2O_4$, $MnNb_2O_6$, $NiNb_2O_6$, $Ti_2Nb_{10}O_{29}$, and $Mn_2Al_2(SiO_4)_2$ on at least a portion of the surface thereof which comprises the steps of:

a. compounding a batch for a glass composition consisting essentially, in weight percent on the oxide basis as calculated from the batch, of about 10-60% $MnO_2$, at least one oxide selected in the indicated proportion from the group consisting of 10-70% $SiO_2$, 13-43% $Al_2O_3$, and 0-35% $B_2O_3$, essentially including at least about 5% $B_2O_3$ and 20% $Al_2O_3$ when $SiO_2$ is absent, not exceeding about 5% $B_2O_3$ when $Al_2O_3$ is absent, and not exceeding about 10% $B_2O_3$ when both $SiO_2$ and $Al_2O_3$ are present, at least about 60% total of $MnO_2$ + $SiO_2$ + $Al_2O_3$ + $B_2O_3$, 0-30% $Nb_2O_5$, 0-35% $La_2O_3$, 0-10% $Ta_2O_5$, 0-15% BaO, 0-10% $SnO_2$, 0-4% ZnO, 0-10% $ZrO_2$, 0-20% $TiO_2$, 0-5% $Fe_2O_3$, 0-10% NiO, 0-3% $Cr_2O_3$, 0-3% CoO and 0-10% $K_2O$;

b. melting the batch at a temperature in the range of about 1500°-1600° C. for a time in the range of about 6-16 hours;

c. forming the molten glass into a glass article;

d. exposing the glass to a temperature in the range of about 600°-1200° C. for a time in the range of about 4-24 hours to obtain crystallization of the glass; and e. exposing the crystallized glass to a temperature in the range of about 500°-1000° C. in a reducing atmosphere for a time in the range of about 178 -10 hours to develop said exuded surface film comprising said transition metal compounds therein.

6. A method in accordance with claim 5 wherein the reducing atmosphere is selected from the group consisting of hydrogen and forming gas.

7. A method in accordance with claim 5 wherein:

a. the batch is compounded to provide a glass consisting essentially, in weight percent on the oxide basis as calculated from the batch, of about 19-40% $SiO_2$, 13-43% $Al_2O_3$, 15-50% $MnO_2$, 0-4% ZnO, 0-10% $TiO_2$, 0-10% $ZrO_2$, 0-10% $SnO_2$, 0-10% NiO, 0-5% $Fe_2O_3$, and 0-3% $Nb_2O_5$, and b. the exuded surface film comprises at least one transition metal compound selected from the group consisting of $Mn_3O_4$, $Fe_3O_4$, $MnAl_2O_4$, $NiAl_2O_4$, $MnFe_2O_4$, $NiFe_2O_4$, $MnNb_2O_6$, $NiNb_2O_6$, $Ti_2Nb_{10}O_{29}$ and $Mn_2Al_2(SiO_4)_2$.

8. A method in accordance with claim 5 wherein:
a. the batch is compounded to provide a glass consisting essentially, in weight percent on the oxide basis as calculated from the batch, of about 20–35% $Al_2O_3$, 5–35% $B_2O_3$, 28–60% $MnO_2$, 0–15% BaO and 0–35% $La_2O_3$; and
b. the exuded surface film comprises at least one transition metal compound selected from the group consisting of $Mn_3O_4$, and $MnAl_2O_4$.

* * * * *

UNITED STATES PATENT AND TRADEMARK OFFICE
CERTIFICATE OF CORRECTION

PATENT NO. : 4,030,903

DATED : June 21, 1977

INVENTOR(S) : Hermann L. Rittler

It is certified that error appears in the above-identified patent and that said Letters Patent are hereby corrected as shown below:

Columns 5 and 6, Table II, Examples 5-8, heading "Crystallization" should be -- Crystallization Treatment --.

Column 6, line 34, after "$CoAl_2O_4$," insert -- $NiAl_2O_4$, --.

Column 7, line 9, "$Co_2TiO_4CoMn_2O_4$," should be -- $Co_2TiO_4$, $CoMn_2O_4$, --.

Column 7, line 10, after "$Mn_3O_4$," insert -- $Fe_3O_4$, --.

Column 7, line 10, "$CoFe_2O_4$," should be -- $CoFe_2O_4$, --.

Column 8, line 29, "$MnNb_2O_6NiNb_2O_6$," should be -- $MnNb_2O_6$, $NiNb_2O_6$, --.

Columns 9 and 10, Table IV, Example Nos. 13, 14, 15, and 16, for heading "Film Growth Treatment", change to read "2 hours - 700°C.; 2 hours - 800°C.; 2 hours - 1000°C.; 2 hours - 500°C.".

Column 11, line 3, Claim 1, before "$FeAl_2O_4$," insert -- $MnAl_2O_4$, --.

Column 11, line 18, Claim 1, "$ValO_4$," should be -- $VAlO_4$, --.

Column 11, line 68, Claim 3, after "$Fe_3O_4$," insert -- $Mn_3O_4$, --.

UNITED STATES PATENT AND TRADEMARK OFFICE
CERTIFICATE OF CORRECTION

PATENT NO. : 4,030,903

DATED : June 21, 1977

INVENTOR(S) : Hermann L. Rittler

It is certified that error appears in the above-identified patent and that said Letters Patent are hereby corrected as shown below:

Column 12, line 11, Claim 4, after "$Fe_2O_3$," insert -- 0-5% CoO, --.

Column 12, line 16, Claim 4, after "$Fe_3O_4$," insert -- $CoFe_2O_4$, --.

Column 12, line 53, Claim 5, "178" should be -- 1/2 --.

*Signed and Sealed this*

*Third* Day of *January 1978*

[SEAL]

Attest:

RUTH C. MASON
*Attesting Officer*

LUTRELLE F. PARKER
*Acting Commissioner of Patents and Trademarks*